United States Patent
Barney et al.

(10) Patent No.: US 9,003,480 B2
(45) Date of Patent: Apr. 7, 2015

(54) CLASSIFYING FILES ON A MOBILE COMPUTER DEVICE

(71) Applicant: International Business Machines Corporation, Armonk, NY (US)

(72) Inventors: Jonathan M. Barney, Kingston, NY (US); Carlos A. Hoyos, Brooklyn, NY (US); Ryan G. Dejana, Longmont, CO (US); Daniel C. Krook, Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 56 days.

(21) Appl. No.: 13/799,257

(22) Filed: Mar. 13, 2013

(65) Prior Publication Data

US 2014/0282814 A1  Sep. 18, 2014

(51) Int. Cl.
*G06F 21/00* (2013.01)
*G06F 21/62* (2013.01)
*G06F 21/60* (2013.01)
*G06F 21/55* (2013.01)
*H04L 29/06* (2006.01)

(52) U.S. Cl.
CPC .......... *G06F 21/6218* (2013.01); *G06F 21/604* (2013.01); *G06F 21/554* (2013.01); *H04L 63/20* (2013.01); *G06F 2221/2105* (2013.01); *G06F 2221/2143* (2013.01)

(58) Field of Classification Search
CPC ..... H04L 63/20; H04L 63/102; G06F 21/227; G06F 21/604; G06F 21/6218
USPC .......................................................... 726/1
See application file for complete search history.

(56) References Cited

U.S. PATENT DOCUMENTS

| 7,769,394 | B1 | 8/2010 | Zhu | |
|---|---|---|---|---|
| 8,010,842 | B2 | 8/2011 | Krivopaltsev et al. | |
| 8,095,112 | B2 | 1/2012 | Chow et al. | |
| 8,640,251 | B1* | 1/2014 | Lee et al. | 726/26 |
| 2004/0221172 | A1* | 11/2004 | Stamos et al. | 713/200 |
| 2006/0148528 | A1* | 7/2006 | Jung et al. | 455/566 |

(Continued)

OTHER PUBLICATIONS

"You can't afford data loss. But you can afford the best in data loss prevention (DLP)."; Data Security; Data Security Features—Websense.com; printed Sep. 19, 2012; <http://www.websense.com/content/data-security-features-and-benefits.aspx>.

(Continued)

*Primary Examiner* — Hadi Armouche
*Assistant Examiner* — Shahriar Zarrineh
(74) *Attorney, Agent, or Firm* — David M. Quinn; Abdul-Samad A. Adediran

(57) ABSTRACT

A client computer extracts contextual information associated with a file that is created. The client computer generates scores for the file by utilizing the contextual information that is extracted. The client computer assigns a value to the file, based on an aggregation of the scores that are generated. The client computer monitors activities on the client computer, wherein the activities trigger an event on the client computer. The client computer determines whether the event is in violation of one or more computer security policies on a server computer, wherein the one or more computer security policies require work-related files to be deleted or encrypted. The client computer classifies the file as personal data or work-related business data. The client computer secures the file, if the file is classified as work-related business data.

14 Claims, 4 Drawing Sheets

(56) References Cited

U.S. PATENT DOCUMENTS

| | | |
|---|---|---|
| 2008/0070495 A1 | 3/2008 | Stricklen et al. |
| 2009/0044185 A1 | 2/2009 | Krivopaltsev |
| 2009/0126012 A1* | 5/2009 | Treadwell et al. ............. 726/22 |
| 2010/0299376 A1* | 11/2010 | Batchu et al. ................ 707/955 |
| 2011/0028124 A1 | 2/2011 | Sprague et al. |
| 2011/0113242 A1 | 5/2011 | McCormack |
| 2012/0110345 A1 | 5/2012 | Pigeon et al. |
| 2012/0185910 A1* | 7/2012 | Miettinen et al. ................ 726/1 |
| 2013/0074142 A1* | 3/2013 | Brennan et al. ................... 726/1 |
| 2013/0254831 A1* | 9/2013 | Roach et al. ...................... 726/1 |
| 2013/0326578 A1* | 12/2013 | Blom et al. ....................... 726/1 |

OTHER PUBLICATIONS

"Zenprise Mobile DLP: Free your users, not your data"; Zenprise Protecting Mobile Enterprises Everywhere; 2011 Study of North American enterprises.

* cited by examiner

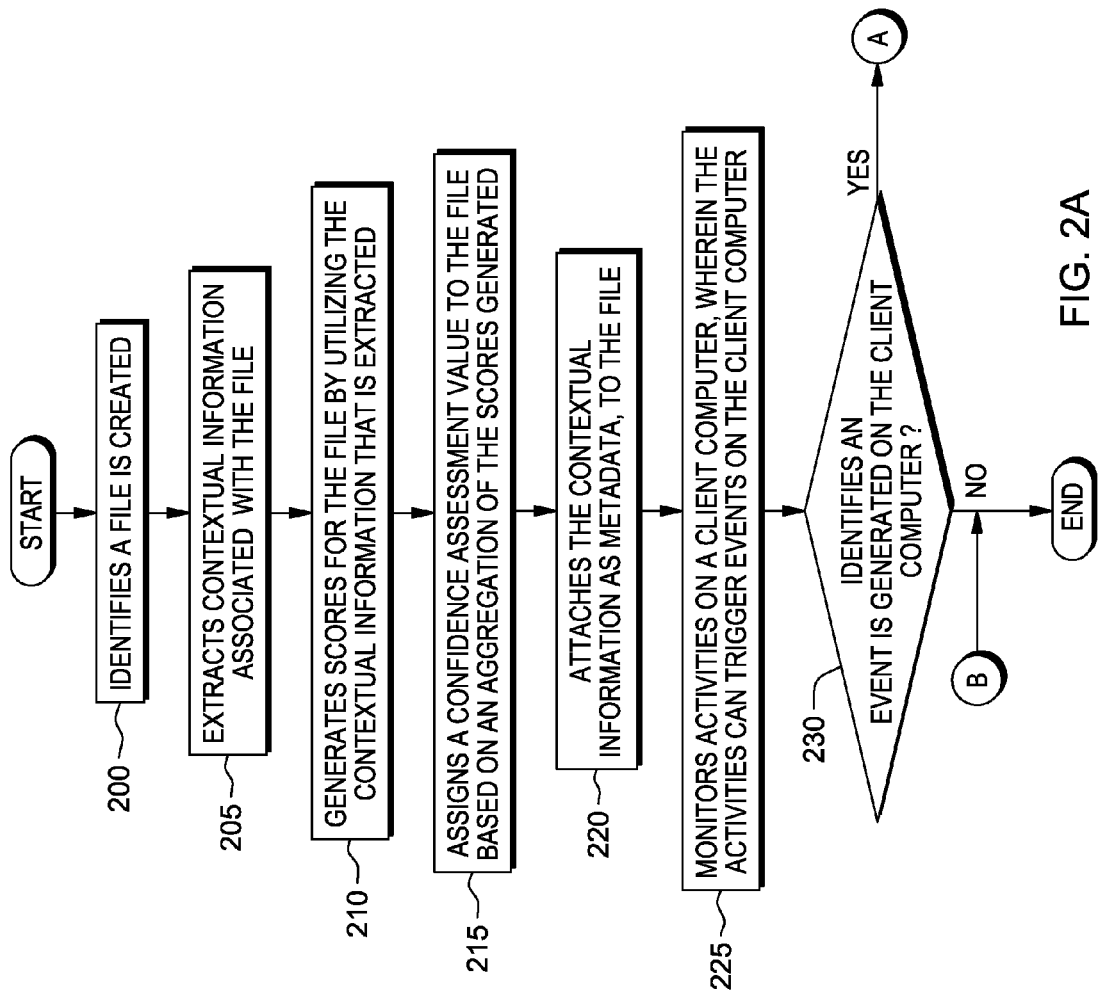

CLASSIFYING FILES ON A MOBILE COMPUTER DEVICE

BACKGROUND

1. Field of the Invention

The present invention relates generally to mobile computer devices, and more specifically to classifying files on the mobile computer device as either personal data or work-related business data.

2. Description of the Related Art

In today's enterprise environments, IT departments must weigh two competing approaches for employees connecting to the company's network and computer systems. The first approach is that IT departments require control of the mobile computer devices that connect to the company's network and computer systems, by issuing company owned devices to employees and implementing strict computer security policies. However, for other business operations the IT departments allow employees to buy their own personal smartphone or other personal mobile computer device to connect to the company's network and computer systems, which can save the IT department money and improve company productivity.

The IT departments have tried to balance these competing approaches by requiring the same strict computer security policies regardless of whether the employee is using a personally owned device or a standard yet order generation company owned device. Trying to balance these competing approaches can lead to conflict between the IT departments trying to enforce the strict computer security policies and employees.

It is known for IT departments to have strict computer security policies for personally owned devices and for company issued devices, wherein the computer security policies can include wiping the device of all data in response to a person, presumably a thief, incorrectly entering an invalid password a specified number of times. However, such policies can adversely affect more than company data if an end-user is using a personal smartphone or other personal mobile computer device for both personal use and to connect to the company's network and computer systems for work-related use. For example, if an unauthorized person gains possession of the employee's (i.e., owner's) mobile computer device being used by the employee for personal and work-related purposes, and the unauthorized person enters an invalid password too many times, then both personal data and work-related business data (i.e., company data) can be destroyed based on the company's strict computer security policies. However, the owner may not wish his or her personal data to be deleted, for example, if the unauthorized person is a child of the owner. Thus, the challenge of identifying and segmenting personal data and company data when enforcing a company's strict computer security policies continues to persist.

SUMMARY

In one embodiment of the invention, a computer program product is disclosed for protecting a work-related business file on a client computer. The computer program product comprises a computer readable storage device and program instructions stored on the computer readable storage device. The program instructions comprise program instructions to extract contextual information that includes computer network information and geographic location information about a computer at a point in time a file was created on the computer. The program instructions further comprise program instructions to generate scores for the file by utilizing the computer network information and the geographic location information that is extracted. The program instructions further comprise program instructions to assign a value to the file, based on an aggregation of the scores that are generated. The program instructions further comprise program instructions to monitor activities on a client computer, wherein the activities trigger an event on the client computer. The program instructions further comprise program instruction to determine whether the event is in violation of one or more computer security policies on a server computer, wherein the one or more computer security policies require work-related files to be deleted or encrypted. The program instructions further comprise program instruction to classify the file as at least one of personal data and work-related business data based on the computer network information and the geographic location information. The program instructions further comprise program instructions to secure the file, if the file is classified as work-related business data.

In another embodiment of the invention, a computer program product is disclosed for protecting a work-related business file on a client computer. The computer program product comprises program instructions to extract contextual information that includes at least one of keywords and patterns in a name of the file and keywords and patterns within the file. The program instructions further comprise program instructions to generate scores for the file by utilizing the keywords and patterns in the name of the file and keywords and patterns within the file that are extracted. The program instructions further comprise program instructions to assign a value to the file, based on an aggregation of the scores that are generated. The program instructions further comprise program instructions to monitor activities on a client computer, wherein the activities trigger an event on the client computer. The program instructions further comprise program instruction to determine whether the event is in violation of one or more computer security policies on a server computer, wherein the one or more computer security policies require work-related files to be deleted or encrypted. The program instructions further comprise program instruction to classify the file as at least one of personal data and work-related business data based on the keywords and patterns in the name of the file and keywords and patterns within the file. The program instructions further comprise program instructions to secure the file, if the file is classified as work-related business data.

BRIEF DESCRIPTION OF THE SEVERAL VIEWS OF THE DRAWINGS

The subject matter which is regarded as an embodiment of the present invention is particularly pointed out and distinctly claimed in the claims at the conclusion of the specification. One manner in which recited features of an embodiment of the present invention can be understood is by reference to the following detailed description of embodiments, taken in conjunction with the accompanying drawings in which:

FIGS. 2A and 2B are flowcharts illustrating operations of the mobile device data protection program that classifies each of the files on the client computer of FIG. 1 as either personal data or work-related business data according to an embodiment of the present invention.

DETAILED DESCRIPTION

Exemplary embodiments now will be described more fully herein with reference to the accompanying drawings. This disclosure may, however, be embodied in many different forms and should not be construed as limited to the exemplary embodiments set forth herein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

Embodiments of the present invention provide a mobile device data protection program, installed on a client computer (e.g., a mobile computer device) and a server computer, for classifying files on the client computer as either personal data or work-related business data. The mobile device data protection program provides functionality for gathering contextual information about files stored on the client computer. The mobile device data protection program utilizes the contextual information to generate scores for each of the files, and assign a confidence assessment value to each of the files based on the scores generated. A score that is generated for a file is indicative of how likely the file is work-related business data, as opposed to personal data. Computer security policies (e.g., maximum number of entries of an invalid password) are configured and stored on the server computer. If an event occurs on the client computer that violates one of the computer security policies, then the mobile device data protection program determines which of the files stored on the client computer are work-related business data. Specifically, if the confidence assessment value assigned to the file that is selected satisfies a configurable threshold condition, then the mobile device data protection program classifies the file that is selected, as work-related business data. However, if the confidence assessment value assigned to one of the files does not satisfy the configurable threshold condition, then the mobile device data protection program classifies the file that is selected, as personal data. Moreover, based on the computer security policies and the event that occurred on the client computer, the mobile device data protection program can either delete or encrypt each of the files that are classified as work-related business data.

Figure 1:
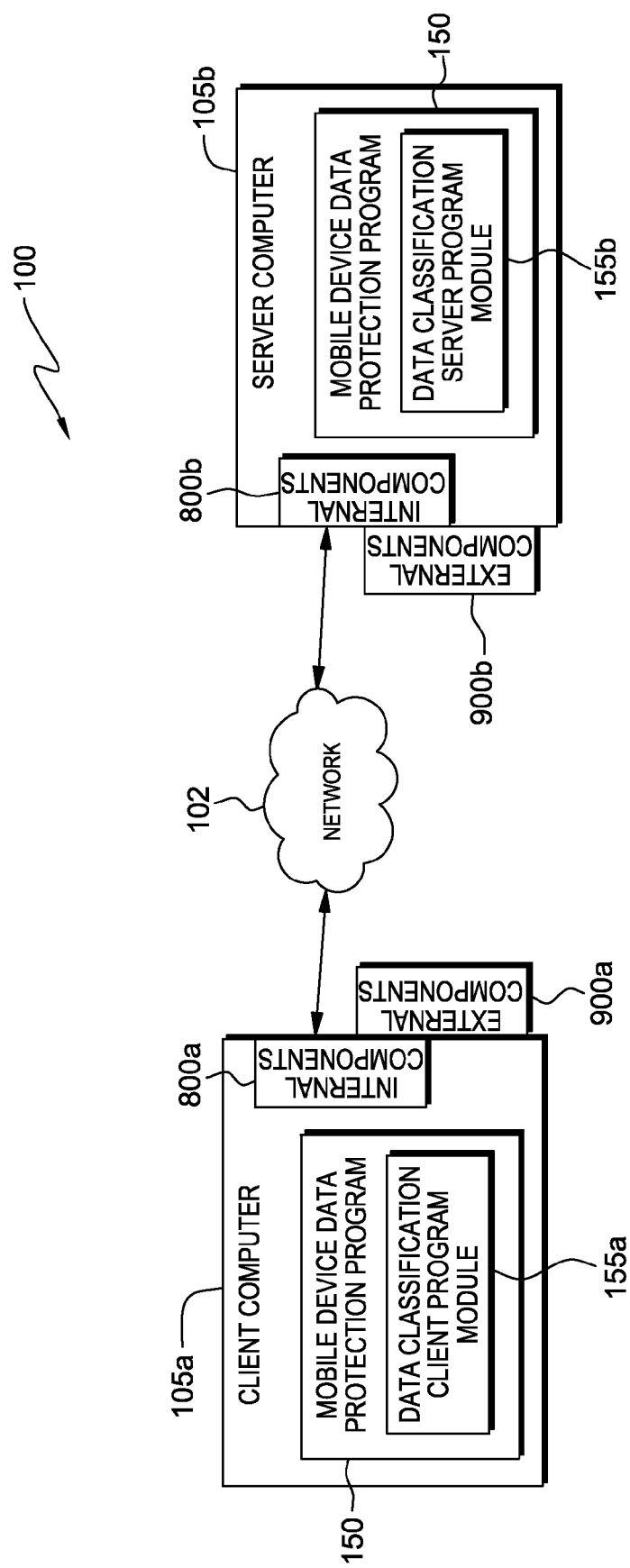
FIG. 1 is a block diagram of a distributed computer system, including a client computer and a server computer having a mobile device data protection program installed according to an embodiment of the present invention.

FIG. 1 illustrates computer system 100 that includes network 102, client computer computer 105a having mobile device data protection program 150 with data classification client program module 155a installed, and server computer 105b having mobile device data protection program 150 with data classification server program module 155b installed. Thus, mobile device data protection program 150 is program code that includes data classification client program module 155a and data classification server program module 155b. Each of program modules 155a and 155b can be selectively installed on computers (e.g., client computer 105a and server computer 105b). Client computer 105a can be any mobile computer device such as a laptop, smartphone, or tablet. Computer security policies are configured and stored on server computer 105b. In addition, client computer 105a and server computer 105b each include respective internal components 800a and 800b, and respective external components 900a and 900b, as described below in more detail with respect to FIG. 3.

Mobile device data protection program 150, mentioned above, classifies files on client computer 105a as either personal data or work-related business data. Data classification client program module 155a gathers contextual information about files stored on client computer 105a, generates scores for each of the files, and assigns a confidence assessment value to each of the files based on the scores generated. Data classification server program module 155b can determine whether an event that occurred on client computer 105a violates the computer security policies stored on server computer 105b. Moreover, data classification client program module 155a can delete or encrypt a file classified as work-related business data if an event that occurred on client computer 105a violates the computer security policies.

Figure 2B:
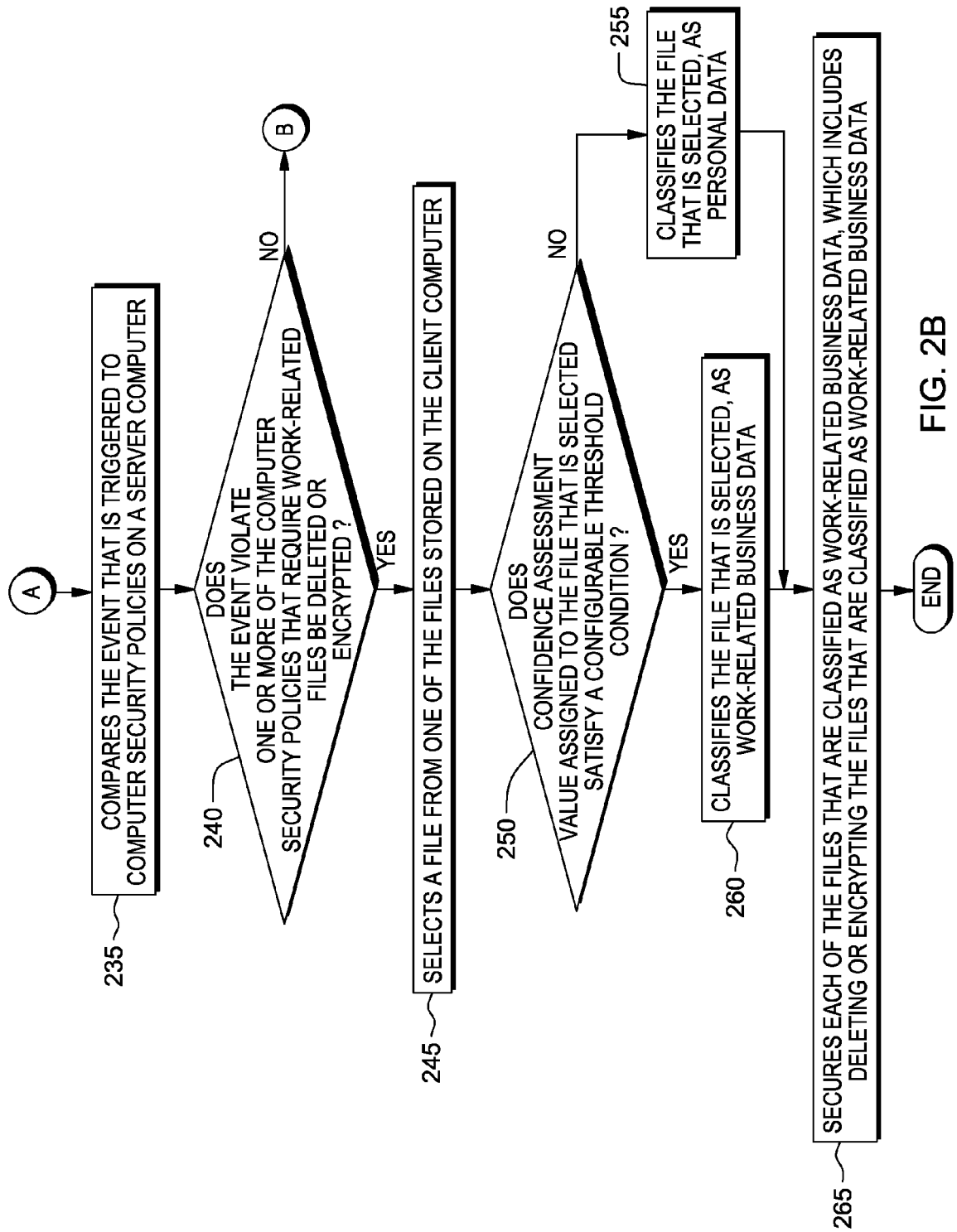

FIGS. 2A and 2B are flowcharts illustrating the steps of the program code of mobile device data protection program 150 in more detail. Mobile device data protection program 150 having data classification client module 155a is a set of the program code installed on client computer 105a, and mobile device data protection program 150 having data classification server module 155b is a set of the program code installed on server computer 105b. In addition, a system programmer/administrator configures computer security policies on server computer 105b. Subsequent to the installation of mobile device data protection program 150 and the configuration of computer security policies, the program code identifies a file is created (block 200). For example, the an end-user can utilize computer 105a to draft a work-related proposal thereby creating a file accessible via a word processing application (with a file name suffix indicative of the word processing application), or even to take a photo thereby creating a file having an image file format such as one of the following: BMP, GIF, JPEG, PNG, TIFF, etc.

In response to a detection of a file being created, the program code extracts contextual information associated with the file (block 205), wherein the contextual information associated with the file refers to at least the following: keywords and patterns in the name of the file, keywords and patterns within the file, geographic location information about client computer 105a at the point in time the file was created, software applications that are running in client computer 105a at the time the file was created, network information corresponding to a network utilized by client computer 105a at the time the file was created, the number of company owned mobile computer devices in close proximity to client computer 105a at the time the file was created, time of day the file was created (e.g., file created during business hours), and the software application that created the file. For example, the work-related keywords and patterns can include words such as "report", "IBM" (i.e., a company name), and/or "project". The personal keywords and patterns can include, for example, words such as "vacation", "beach", and/or "son". Moreover, geographic location about client computer 105a refers to global positioning system (GPS) coordinates corresponding to the location of client computer 105a at the time the file is created. If the geographic location of client computer 105a at the time the file was created is a work facility, then this is a strong indication that the file is a work-related business file. The network information, mentioned above, corresponding to the network utilized by client computer 105a refers to information about whether the device is utilizing a network of their employer (i.e., a company network) or utilizing a network that controlled by their employer (i.e., non-company network) such as a mobile public hotspot or home wireless network.

Next, the program code of mobile device data protection program 150 generates scores for the file by utilizing the contextual information that is extracted (block 210). For example, in regard to the contextual information referring to network information, if client computer 105a was connected to a company network at the time the file was created, then the program code generates a score for the file wherein the score for the file indicates that the file is most likely work-related business data. Thus, the score can indicate how likely the file is work-related business data. However, if client computer 105a was connected to a mobile public hotspot or home wireless network at the time the file was created, then the program code generates a score for the file wherein the score for the file indicates that the file is most likely personal data. In regard to the contextual information referring to the number of company owned mobile computer devices in close proximity to client computer 105a at the time the file was created, if the program code scans the network to which client computer 105a is connected, identifies a number of company owned devices on the same network having approximately the same GPS location (e.g., distance between client computer 105a and the company owned devices ranges from 0 to one fourth of a mile), and the number of company owned devices exceeds a configurable threshold parameter value then the program code generates a score for the file wherein the score for the file indicates that the file is most likely work-related business data because the file was likely generated during a business meeting. Otherwise, if the program code scans the network and identifies a number of company owned devices on the network and the number of company owned devices on the same network does not exceed the configurable threshold parameter value, then the program code generates a score for the file wherein the score indicates that the file is most likely personal data.

Subsequent to the program code generating scores for the file, the program code assigns a confidence assessment value to the file based on an aggregation of the scores that are generated (block 215). The program code attaches the contextual information as metadata, to the file (block 220). The program code monitors activities on client computer 105a, wherein the activities can trigger events on client computer 105a (block 225). The events can include entering a password to unlock the device incorrectly ten times or the device is reported as missing. If the program code does not identify an event is generated on client computer 105a (decision block 230, "NO" branch), then the program code ends. If the program code identifies an event is generated on client computer 105a (decision 230, "YES" branch), then program code compares the event that is triggered to the computer security policies on server computer 105b (block 235).

Next, the program code determines whether the event violates one or more of the computer security policies that require work-related files be deleted or encrypted (decision block 240). Specifically, the program code can determine if the event violates one or more of the computer security policies that require work-related files to be deleted or encrypted, based on the comparison of the event to the computer security policies on server computer 105b. If the event does not violate one or more of the computer security policies that require work-related files be deleted or encrypted (decision block 240, "NO" branch), then the program code ends. However, if the event violates one or more of the computer security policies that require work-related files be deleted or encrypted (decision block 240, "YES" branch), then the program code selects a file from one of the files stored on the client computer (block 245).

Next, if the confidence assessment value assigned to the file that is selected does not satisfy a configurable threshold condition (decision block 250, "NO" branch), then the program code classifies the file that is selected, as personal data (block 255). Subsequently, based on the computer security policies and the event triggered on client computer 105a, program code secures each of the files that are classified as work-related business data, which includes deleting or encrypting the files that are classified as work-related business data (block 265).

However, if the confidence assessment value assigned to the file that is selected satisfies a configurable threshold condition (decision block 250, "YES" branch), then the program code classifies the file that is selected, as work-related business data (block 260). Subsequently, based on the computer security policies and the event triggered on client computer 105a, program code secures each of the files that are classified as work-related business data, which includes deleting or encrypting the files that are classified as work-related business data (block 265). For example, if client computer 105a is reported as stolen, then the program code can delete or encrypt the files on client computer 105a classified as work-related business data. In the disclosed in embodiment, if client computer 105a is reported as stolen, then a prompt can be sent to a person, such as a system programmer/administrator, on server computer 105b wherein the prompt is a request for the person to decide whether to remotely delete files classified as work-related data on client computer 105a.

Figure 3:
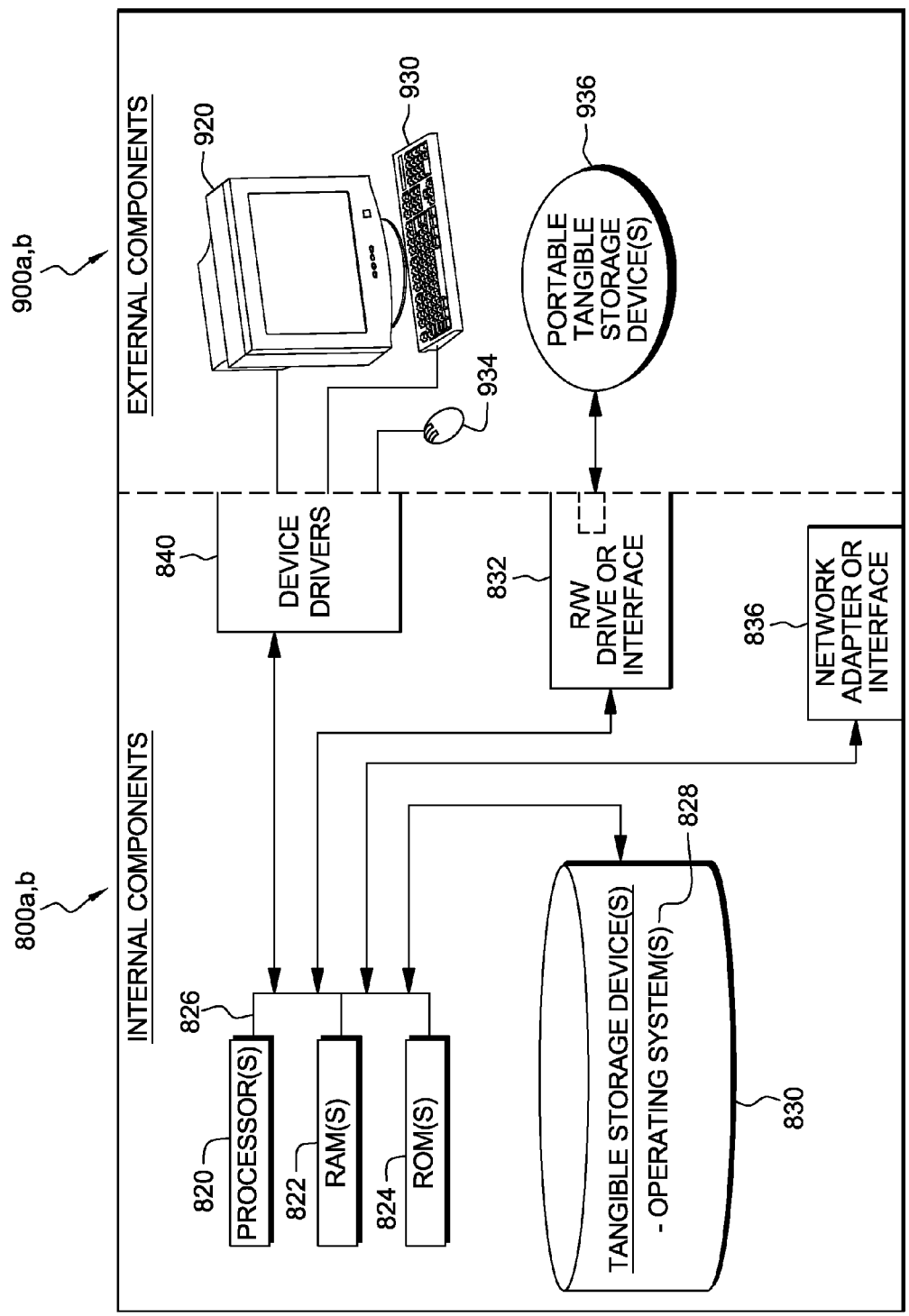
FIG. 3 is a block diagram depicting internal and external components of the client computer and the server computer of FIG. 1 according to an embodiment of the present invention.

FIG. 3 is a block diagram depicting a set of internal components 800a and a set of external components 900a that correspond to client computer 105a, as well as a set of internal components 800b and a set of external components 900b that correspond to server computer 105b. Internal components 800a and 800b each include one or more processors 820, one or more computer readable RAMs 822, one or more computer readable ROMs 824 on one or more buses 826, and one or more operating systems 828 and one or more computer readable tangible storage devices 830. The one or more operating systems 828 and mobile device data protection program 150 with data classification client program module 155a on client computer 105a; and mobile device data protection program 150 with data classification server program module 155b on server computer 105b are stored on one or more of the respective computer readable tangible storage devices 830 for execution by one or more of the respective processors 820 via one or more of the respective RAMs 822 (which typically include cache memory). In the embodiment illustrated in FIG. 3, each of the computer readable tangible storage devices 830 is a magnetic disk storage device of an internal hard drive. Alternatively, each of the computer readable tangible storage devices 830 is a semiconductor storage device such as ROM 824, EPROM, flash memory or any other computer readable tangible storage device that can store a computer program and digital information.

Each set of internal components 800a and 800b includes a R/W drive or interface 832 to read from and write to one or more portable computer readable tangible storage devices 936 such as CD-ROM, DVD, memory stick, magnetic tape, magnetic disk, optical disk or semiconductor storage device. Mobile device data protection program 150 with data classification client program module 155a on client computer 105a; and mobile device data protection program 150 with data classification server program module 155b on server computer 105b can be stored on one or more of the respective portable computer readable tangible storage devices 936, read via the respective R/W drive or interface 832 and loaded into the respective hard drive or computer readable tangible storage device 830.

Furthermore, each set of internal components 800a and 800b also includes a network adapter or interface 836 such as TCP/IP adapter card, wireless wi-fi interface card, or 3G or 4G wireless interface card or other wired or wireless communication link. Mobile device data protection program 150 with data classification client program module 155a on client computer 105a; and mobile device data protection program 150 with data classification server program module 155b on server computer 105b can be downloaded to respective computers 105a and 105b from an external computer or external storage device via a network (for example, the Internet, a LAN, or a WAN) and respective network adapters or interfaces 836. From the network adapter or interface 836, mobile device data protection program 150 with data classification client program module 155a on client computer 105a; and mobile device data protection program 150 with data classification server program module 155b on server computer 105b are loaded into respective hard drive or computer readable tangible storage device 830. The network may comprise copper wires, optical fibers, wireless transmission, routers, firewalls, switches, gateway computers and/or servers.

Each set of external components 900a and 900b can include a computer display monitor 920, a keyboard 930, and a computer mouse 934. External components 900a and 900b can also include touch screens, virtual keyboards, touch pads, pointing devices, and other human interface devices. Each set of internal components 800a and 800b also includes device drivers 840 to interface to computer display monitor 920, keyboard 930 and computer mouse 934. The device drivers 840, R/W drive or interface 832 and network adapter or interface 836 comprise hardware and software in which the software is stored in computer readable tangible storage device 830 and/or ROM 824.

It should be appreciated that FIG. 3 provides only an illustration of one implementation and does not imply any limitations with regard to the environments in which different embodiments may be implemented. A variety of modifications to the depicted environments may be implemented. Moreover, a variety of modifications to the depicted environments may be made based on design and implementation requirements.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Computer program code for carrying out operations for aspects of an embodiment of the invention may be written in any combination of one or more programming languages, including an object oriented programming language such as JAVA, Smalltalk, C++ or the like and conventional procedural programming languages, such as the "C" programming language or similar programming languages. The program code may execute entirely on the end-user's computer, partly on the end-user's computer, as a stand-alone software package, partly on the end-user's computer and partly on a remote computer, or entirely on a remote computer or server. In the latter scenario, the remote computer may be connected to the end-user's computer through any type of network, including a LAN or WAN, or the connection may be made to an external computer (for example, through the Internet using an Internet Service Provider). Alternatively, the functions of the aforementioned programs can be implemented in whole or in part by computer circuits and other hardware (not shown).

Based on the foregoing, a method, computer system, and computer program product have been disclosed for classifying files on a computer as either personal data or work-related business data. However, numerous modifications and substitutions can be made without deviating from the scope of an embodiment of the invention. Therefore, one or more embodiments of the invention have been disclosed by way of example and not limitation.

What is claimed is:

1. A computer program product for protecting a work-related business file on a client computer, the computer program product comprising:
   a computer readable storage device and program instructions stored on the computer readable storage device, the program instructions include:
   program instructions to extract contextual information that includes computer network information and geographic location information about a computer at a point in time a file was created on the computer, wherein the contextual information further includes at least the following: software applications that are running at the time the file is created, a number of company owned mobile computer devices within one fourth of a mile in proximity to the client computer at the time the file is created, a time of day the file is created, and a software application that created the file;
   program instructions to generate scores for the file by utilizing the computer network information and the geographic location information that is extracted, wherein the scores is an indication of how likely the file is work-related business data;
   program instructions to assign a value to the file, based on an aggregation of the scores that are generated;
   program instructions to monitor activities on a client computer, wherein the activities trigger an event on the client computer;
   program instruction to determine whether the event is in violation of one or more computer security policies on a server computer, wherein the one or more computer security policies require work-related files to be deleted or encrypted;
   program instruction to classify the file as at least one of personal data and work-related business data based on the computer network information and the geographic location information; and
   program instructions to secure the file, if the file is classified as work-related business data.

2. The computer program product of claim 1, wherein the client computer is laptop, smartphone, or tablet.

3. The computer program product of claim 1, wherein program instructions to determine whether the event is in violation of one or more of the computer security policies that require work-related files to be deleted or encrypted comprises comparing the event to the one or more computer security policies.

4. The computer program product of claim 1, wherein the program instructions to classify the file as personal data or work-related business data comprises additional program instructions to determine whether the value that is assigned to the file satisfies a configurable threshold condition, wherein the program instructions classify the file as work-related business data if the configurable threshold condition is satisfied, or classifies the file as personal data if the configurable threshold condition is not satisfied.

5. The computer program product of claim 1, wherein the program instructions to secure the file comprises additional program instructions to delete the file, if the file is classified as work-related business data, and the client computer is stolen.

6. The computer program product of claim 1, wherein the program instructions to secure the file comprises additional program instructions to send a prompt sent to a person, such as a system programmer/administrator, on the server computer wherein the prompt is a request for the person to decide whether to remotely delete the file if the file is classified as work-related business data on the client computer.

7. The computer program product of claim 1, wherein the program instructions to secure the file comprises additional program instructions to encrypt the file if the file is classified as work-related business data on the client computer.

8. A computer program product for protecting a work-related business file on a client computer, the computer program product comprising:
   a computer readable storage device and program instructions stored on the computer readable storage device, the program instructions include:
   program instructions to extract contextual information that includes (i) keywords and patterns in a name of the file and (ii) keywords and patterns within the file, and wherein the contextual information further includes at least the following: software applications that are running at the time the file is created, a number of company owned mobile computer devices within one fourth of a mile in proximity to the client computer at the time the file is created, a time of day the file is created, and a software application that created the file;
   program instructions to generate scores for the file by utilizing the keywords and patterns in the name of the file and keywords and patterns within the file that are extracted, wherein the scores is an indication of how likely the file is work-related business data;
   program instructions to assign a value to the file, based on an aggregation of the scores that are generated;
   program instructions to monitor activities on a client computer, wherein the activities trigger an event on the client computer;
   program instruction to determine whether the event is in violation of one or more computer security policies on a server computer, wherein the one or more computer security policies require work-related files to be deleted or encrypted;
   program instruction to classify the file as at least one of personal data and work-related business data based on the keywords and patterns in the name of the file and keywords and patterns within the file; and
   program instructions to secure the file, if the file is classified as work-related business data.

9. The computer program product of claim 8, wherein the client computer is laptop, smartphone, or tablet.

10. The computer program product of claim 8, wherein program instructions to determine whether the event is in violation of one or more of the computer security policies that require work-related files to be deleted or encrypted comprises comparing the event to the one or more computer security policies.

11. The computer program product of claim 8, wherein the program instructions to classify the file as personal data or work-related business data comprises additional program instructions to determine whether the value that is assigned to the file satisfies a configurable threshold condition, wherein the program instructions classify the file as work-related business data if the configurable threshold condition is satisfied, or classifies the file as personal data if the configurable threshold condition is not satisfied.

12. The computer program product of claim 8, wherein the program instructions to secure the file comprises additional program instructions to delete the file, if the file is classified as work-related business data, and the client computer is stolen.

13. The computer program product of claim 8, wherein the program instructions to secure the file comprises additional program instructions to send a prompt sent to a person, such as a system programmer/administrator, on the server computer wherein the prompt is a request for the person to decide whether to remotely delete the file if the file is classified as work-related business data on the client computer.

14. The computer program product of claim 8, wherein the program instructions to secure the file comprises additional program instructions to encrypt the file if the file is classified as work-related business data on the client computer.

\* \* \* \* \*